United States Patent [19]

Hope

[11] Patent Number: 4,802,659
[45] Date of Patent: Feb. 7, 1989

[54] LEAF SPRING

[75] Inventor: Stephen A. Hope, Sunbury-on-Thames, England

[73] Assignee: British Petroleum Company p.l.c., London, England

[21] Appl. No.: 72,638

[22] Filed: Jul. 13, 1987

[30] Foreign Application Priority Data

Jul. 17, 1986 [GB] United Kingdom ............... 8617540

[51] Int. Cl.$^4$ .................... B60G 11/02; F16F 1/36
[52] U.S. Cl. .................... 267/149; 267/36.1; 267/52; 267/158; 280/720
[58] Field of Search .................... 267/36.1–37.4, 267/42, 44, 45, 46, 47–50, 158–165, 148–149, 7, 52; 124/23 R, 86, 24 R; 280/718–720

[56] References Cited

U.S. PATENT DOCUMENTS

| | | | |
|---|---|---|---|
| 1,848,768 | 3/1932 | Cowdery | 124/23 R |
| 2,980,158 | 4/1961 | Meyer | 154/1 |
| 3,038,830 | 6/1962 | Groves | 124/24 R X |
| 3,190,632 | 6/1965 | Barenyi | 267/158 |
| 3,250,546 | 5/1966 | Allison | 267/52 X |
| 3,479,389 | 7/1973 | Duchemin | 267/52 |
| 3,534,951 | 10/1970 | Brownyer | 267/47 |
| 3,585,086 | 6/1971 | Hrusovsky | 267/47 X |
| 3,975,005 | 8/1976 | Duchemin | 267/47 |
| 4,018,205 | 4/1977 | Meyer | 124/23 R X |
| 4,054,118 | 10/1977 | McKee et al. | 124/23 R |
| 4,575,057 | 3/1986 | Robertson | 267/47 |
| 4,611,793 | 9/1986 | Nishiyama et al. | 267/52 |
| 4,705,015 | 11/1987 | Troncoso, Jr. | 124/86 X |
| 4,730,815 | 3/1988 | Von Estorff et al. | 267/52 |
| 4,732,371 | 3/1988 | Pflederer | 267/52 |

FOREIGN PATENT DOCUMENTS

| | | |
|---|---|---|
| 0147077 | 7/1985 | European Pat. Off. . |
| 0178286 | 4/1986 | European Pat. Off. . |
| 0213110 | 3/1987 | European Pat. Off. . |

*Primary Examiner*—Douglas C. Butler
*Attorney, Agent, or Firm*—Morgan & Finnegan

[57] ABSTRACT

A leaf spring of fibre reinforced composite material comprises a longitudinal cross-section having a thickened central zone, adjacent tapered zones and end zones. The tapered zones have curved surfaces comprising convex and concave portions, the convex portions being adjacent to the central zones and the concave portions being adjacent to the end zones. Each convex and concave portion is a segment of a curve defined by the equation $$(X/A)^c + (Y/B)^D = 1.$$

12 Claims, 3 Drawing Sheets

LEAF SPRING

The present invention relates to leaf springs and more particularly relates to leaf springs for use on vehicles.

The suspended portion of a vehicle is attached to the wheels by elastic members designed to cushion the impact of road surface irregularities. A variety of spring elements have been used, including coil springs, air springs, hydropneumatic suspension and leaf springs. Generally, a leaf spring comprises an elongated laminate of elastic materials. Leaf springs are used in a variety of vehicle applications because they have high elastic energy storage per unit weight and they enable the wheels to be accurately positioned with respect to the other chassis components without the aid of control arms, radius rods and the like. The two ends of the spring have means for attaching the spring to the vehicle chassis, and the wheel axle is attached to the central portion of the spring.

Previously, leaf springs for vehicles have been fabricated from a number of superimposed steel leaves. Steel leaf springs have a number of disadvantages including a relatively heavy construction and a tendency to corrode. In order to reduce the overall weight of vehicles, leaf springs fabricated from fibre reinforced composite materials have been substituted for steel leaf springs.

The present invention relates to an improved form of fibre reinforced composite leaf spring which has advantages of reduced local bending stresses compared to known fibre reinforced composite leaf springs.

Thus according to the present invention there is provided a leaf spring of fibre reinforced composite material comprising a longitudinal, vertical cross-section having a central zone and two end zones, the central zone being thicker than the end zones, the cross-section having a tapered zone between the central zone and each of the end zones, the tapered zone having upper and lower curved surfaces, each curved surface comprising a first convex portion and a second concave portion, the convex portion being adjacent to the central zone and the concave portion being adjacent to the end zone, and each convex and concave portion being a segment of a curve which is defined in the x and y axes of the cross-section of the spring, wherein the x axis is the longitudinal axis of the spring and the y axis is perpendicular to the x axis and is in the plane of the vertical cross-section and where P is defined as the length in the x axis of the segment of the curve and h is defined as the length in the y axis of the segment of the curve, and the curve is defined by the mathematical equation $$(X/A)^C + (Y/B)^D = 1$$

wherein X and Y are displacements in the x and y axes respectively and A is defined as the solution to the mathematical equation for an ellipse $$(P/A)^C + ((B-h)/B)^D = 1$$

Wherein A, B, C and D are simply numbers that can be chosen arbitrarily to define the exact path of the ellipses in space. Whatever the values of A, B, C and D chosen, the curves defined will always form part of an ellipse.

Preferably, B is not less than h and is not greater than 1000. Preferably, C is in the range 0 to 10. Preferably, D is in the range 0 to 4. Preferably, the concave and convex portions are contiguous with the surfaces of adjacent zones so that the surfaces of the spring are free from discontinuities. Preferably, the surfaces of the central zone are flat and parallel to the longitudinal axis of the spring. The surface of the spring at the point of contact between the end zone and the tapered zone may also be flat and parallel to the longitudinal axis of the spring.

In a preferred embodiment each curved surface of a tapered zone comprises a pair of similarly shaped, though opposed segments of the same curve.

The surfaces of the tapered zones may be similarly shaped or may be dissimilar, for example the surfaces on the upper sides of the tapered zones of the spring may be similar to each other but differently shaped from the surfaces on the lower sides of the tapered zones of the spring which may also be similarly shaped to each other.

It is envisaged that the concave and convex portions may also be segments of a circle.

It is further envisaged that the concave and convex portions may be separated by other surfaces, for example straight surfaces.

The central thicker zone may be homogeneous with the surrounding material or may be separately attached to the leaf in a suitable manner e.g. by use of an adhesive. The fraction of the length of the spring which is thickened (the central zone) is usually of the order 5 to 25%.

The leaves may be fabricated from a suitable fibre reinforced composite material, for example, fibre resin combinations such as glass fibre, carbon fibre and thermosetting resin formulations. The leaf may be homogeneous or may comprise layers of differing characteristics such as having oriented or non-oriented fibres.

The use of standard metal spring clamps on a composite leaf spring can result in large local bending stresses on the leaf when it is under load. These stresses may be reduced by increasing the thickness of the spring but this usually results in an increase in the stiffness of the spring. The present invention enables the thickening of the spring to be achieved with little or no change in the spring rate or stiffness. The length of the central zone may be selected to provide the required bending stiffness for the spring.

BRIEF DESCRIPTION OF DRAWINGS

The invention will now be described by way of example only and with reference to the accompanying drawings.

Figure 1:
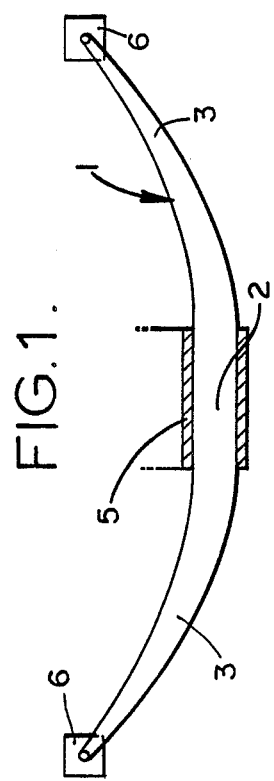

In the known form of leaf spring of FIG. 1, the leaf spring (1) has a longitudinal vertical cross-section being thickest at its central zone (2) and tapering towards its ends (3). The central zone of the leaf is clamped with the clamps (5) to the axle of the vehicle (not shown) and the ends of the leaf are attached by end fittings (6) to the chassis of the vehicle (not shown).

Figure 2:
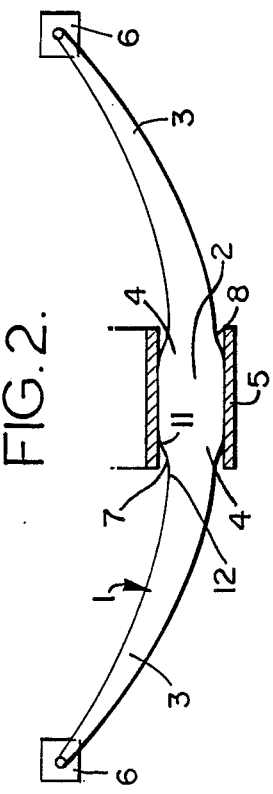
FIGS. 1 and 2 show respectively, longitudinal vertical cross-sections through a known leaf spring and a leaf spring according to the invention.

In FIG. 2 the leaf spring (1) according to the invention has a longitudinal vertical cross-section having a central zone (2), adjacent tapered zones (4) and end zones (3); the central zone being thicker than the end zones. The tapered zones have upper (7) and lower (8) curved surfaces which comprise convex (11) and concave (12) portions. The central zone of the leaf is clamped with clamps (5) to the axle of the vehicle (not shown) and the ends of the leaf are attached by end fittings (6) to the chassis of the vehicle (not shown).

Figure 3:
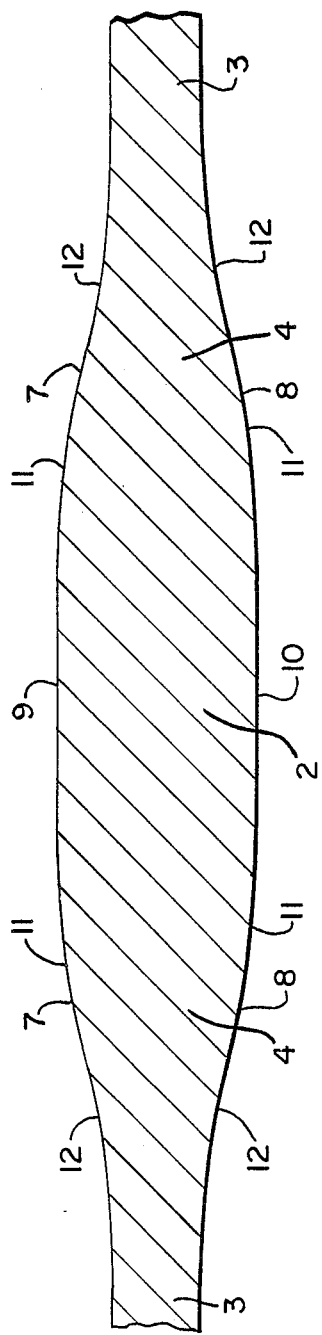
FIG. 3 shows in detail the cross-section of the central and tapered zones of a leaf spring according to the invention.

In FIG. 3 the cross-section of the spring comprises a central zone (2) which has flat, parallel upper (9) and lower (10) surfaces and which is thicker than the end zones (3). The tapered zones (4) comprise upper surfaces (7) and lower surfaces (8) which comprise convex (11) and concave (12) portions. The convex and concave portions shown in FIG. 3 are all similar but it is envisaged that they may be different. For example, the curved surfaces on the upper side of the spring may be different to the curved surfaces on the lower side of the spring and the spring may therefore be asymmetric about the longitudinal axis. Preferably the surfaces of the thicker central zone are flat and parallel to the longitudinal axis of the spring. The length of the central zone in the x axis is selected to give the required spring stiffness.

Figure 4:
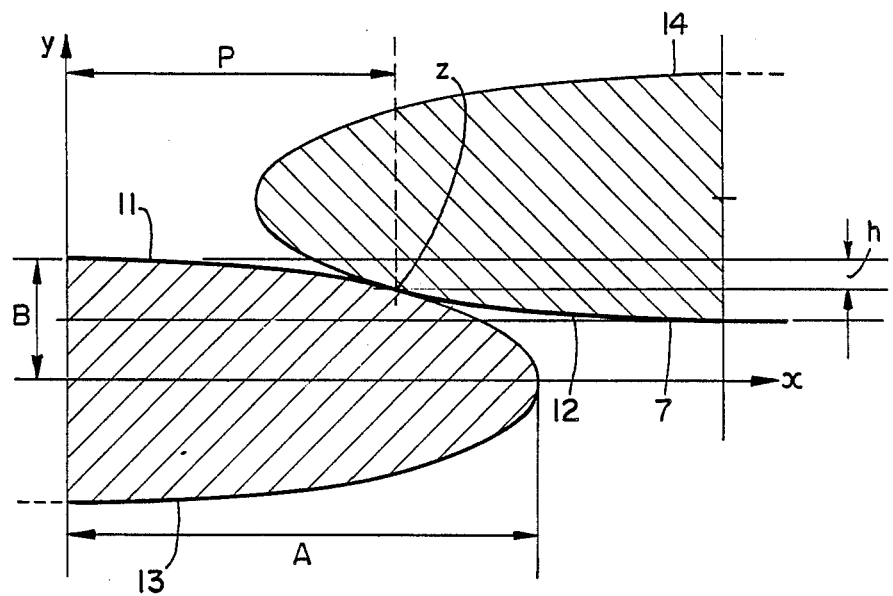
FIG. 4 shows, in detail, the construction in the x and y axes of one curved surface of a tapered zone of a spring according to the invention.

FIG. 4 shows, in detail, the construction in the x and y axes of one curved surface of a tapered zone of a spring according to the invention. The curved surface (7) comprises convex (11) and concave (12) portions which are segments of two curves (13) and (14). The first curve (13) is defined by the equation $$(X/A)^C + (Y/B)^D = 1$$

and in this particular example $B = 4.0$; $C = 2.0$; $D = 0.001$ and A is defined by substituting these values into the equation at the point where $X = P$ and $Y = B - h$ where P is the length in the x axis of the segment and h is the length in the y axis of the segment. The second curve (14) is identical to curve (13), in this example, so that the concave portion (12) is identical to the convex portion (11) in shape but is in opposition. Thus, this curved surface has rotational symmetry of 180° about an axis z, perpendicular to the x and y axes. It is preferred that the two portions of each curved surface are constructed from similar curves as in this example, but different curves may be used. Most preferably, the portions should be selected so that the surface of the spring is free of discontinuities.

Figure 5:
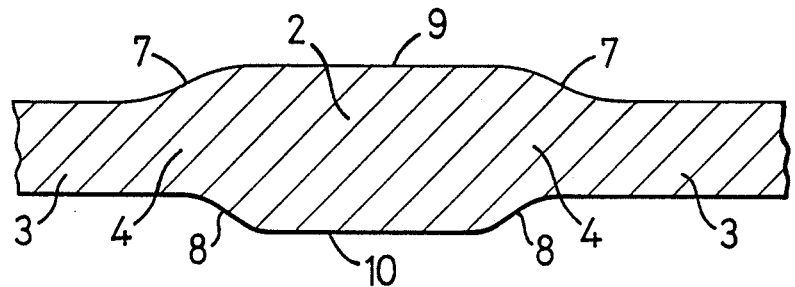
FIGS. 5-7 show alternate embodiments of a leaf spring.

FIG. 5 is a leaf spring in which the profile of the upper surface is different from that of the lower surface.

Figure 6:
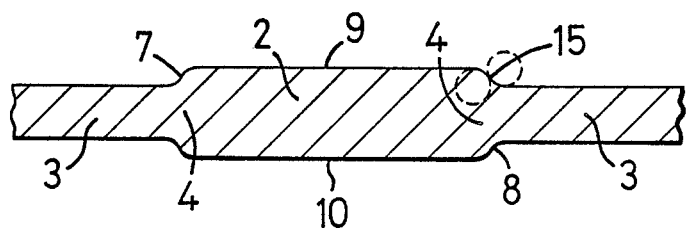

FIG. 6 shows an embodiment of a leaf spring in which the concave and convex portions of the bulge are both arcs of a circle.

Figure 7:
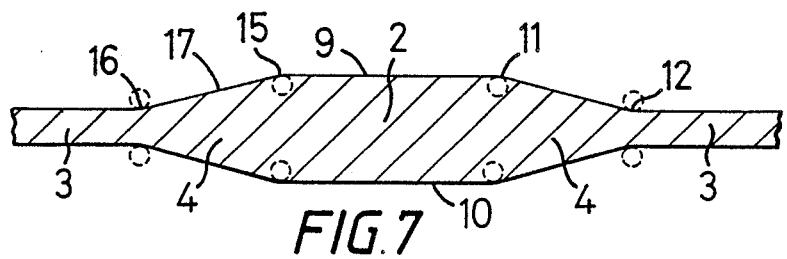

FIG. 7 is an embodiment of a leaf spring wherein the concave and convex portions of the bulge are arcs of circles and are separated by a surface whose profile is a straight line.

I claim:

1. A leaf spring of fibre reinforced composite material for attachment to the wheel axle of a vehicle for reducing local stresses when the leaf spring is under load, said spring comprising a longitudinal, vertical cross-section having a central zone and two end zones, the central zone being clamped to said axle with the spring ends attached to the vehicle chassis, the central zone being thicker than the end zones, said longitudinal, vertical cross-section further having a tapered zone between the central zone and each of the end zones, the tapered zone having upper and lower curved surfaces, each curved surface comprising a first convex portion and a second concave portion, the convex portion being adjacent to the central zone and the concave portion being adjacent to the end zone, and each convex and concave portion being a segment of a curve which is defined by x and y axes of the longitudinal, vertical cross-section of the spring, wherein the x axis is the longitudinal axis of the spring and the y axis is perpendicular to the x axis and is in the plane of the vertical cross-section and where P is defined as the length in the x axis of the segment of the curve and h is defined as the length in the y axis of the segment of the curve, and the curve is defined by the mathematical equation $$(X/A)^C + (Y/B)^D = 1$$

wherein X and Y are displacements in the x and y axes respectively and A is defined as the solution to the mathematical equation $$(P/A)^C + ((B-h)/B)^D = 1$$

where B, C and D are arbitrary numbers selected to define the path of an ellipse in space.

2. A leaf spring according to claim 1 in which B is not less than h and not greater than 1000.

3. A leaf spring according to claim 1 in which C is in the range 0 to 10.

4. A leaf spring according to claim 1 in which D is in the range 0 to 4.

5. A leaf spring according to claim 1 in which the concave and convex portions are contiguous with the surfaces of adjacent zones so that the surfaces of the spring are free from discontinuities.

6. A leaf spring according to claim 1 in which the surfaces of the central zone are flat and parallel to the longitudinal axis of the cross-section of the spring.

7. A leaf spring according to claim 1 in which the surface of the spring at the point of contact between the end zone and the tapered zone is flat and parallel to the longitudinal axis of the cross-section of the spring.

8. A leaf spring according to claim 1 in which the curved surface of a tapered zone comprises a pair of similarly shaped, though opposed segments of the same curve.

9. A leaf spring according to claim 1 in which the upper surfaces of the tapered zones are similarly shaped to each other but are differently shaped to the lower surfaces of the tapered zones.

10. A leaf spring according to claim 1 in which the concave and convex portions are segments of circles.

11. A leaf spring according to claim 1 in which the convex and concave portions are separated by other surfaces.

12. A leaf spring according to claim 1 in which the central zone is 5 to 25% of the length of the spring.

* * * * *

UNITED STATES PATENT AND TRADEMARK OFFICE
CERTIFICATE OF CORRECTION

PATENT NO. : 4,802,659
DATED : February 7, 1989
INVENTOR(S) : Stephen A. Hope

It is certified that error appears in the above-identified patent and that said Letters Patent is hereby corrected as shown below:

Column 3, line 28, after "portion" insert -- . --

Column 3, line 29, delete "which are segments of two curves (13) and (14)."

Column 3, line 30, delete "(13)"

Column 3, line 39, delete "(14)" and "(13)"

after "to" insert -- the first --

Sheet 2, Figure 4, delete curves 13 and 14

Signed and Sealed this

Fifteenth Day of May, 1990

Attest:

HARRY F. MANBECK, JR.

*Attesting Officer*         Commissioner of Patents and Trademarks